Figure 2:
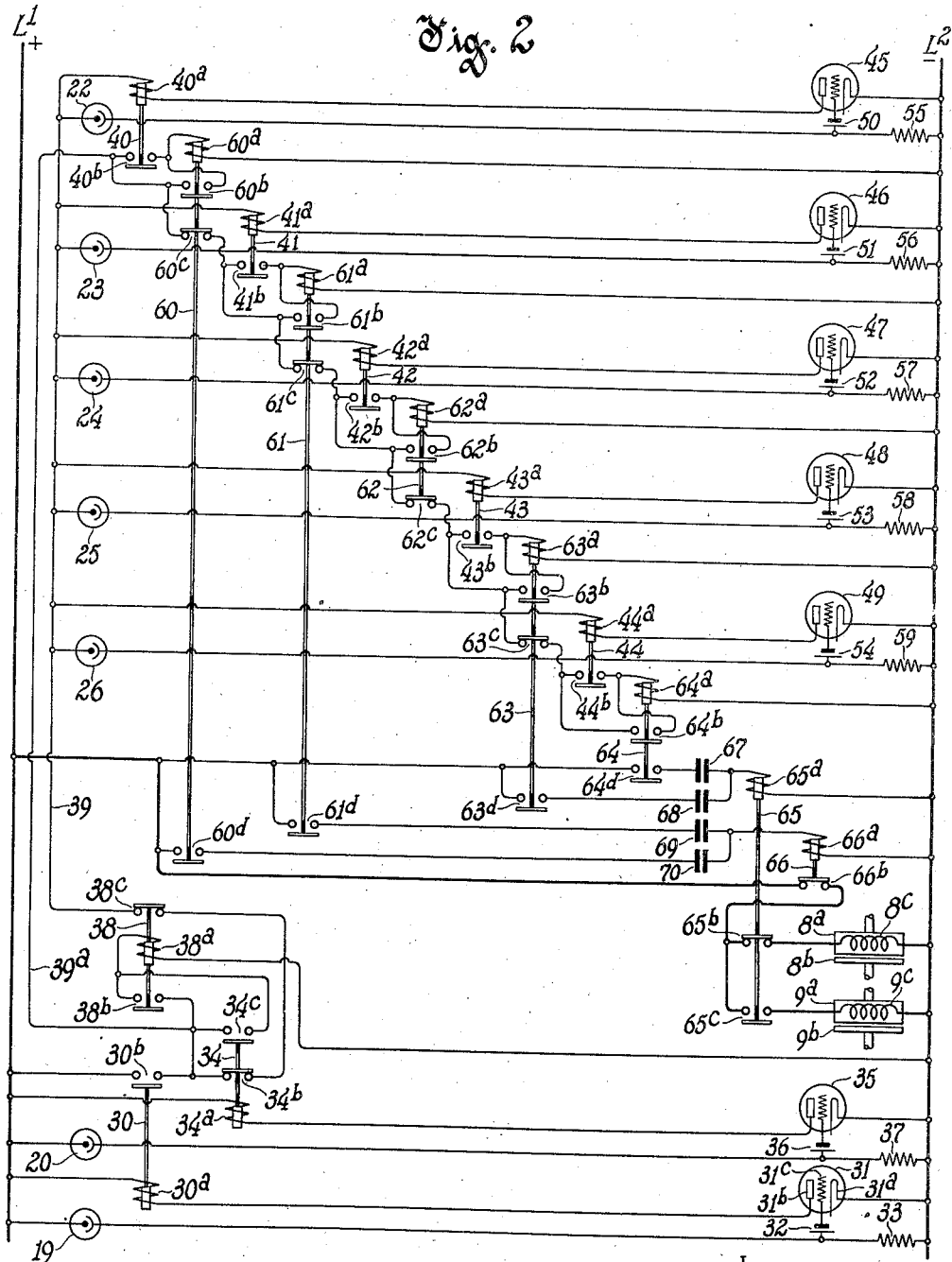

Jan. 25, 1944.    G. C. BROWN    2,339,976
CONTROLLER FOR VARIABLE SPEED DRIVES
Filed July 27, 1940    2 Sheets-Sheet 1

Inventor
Glendon C. Brown, Deceased.
By Jean F. Brown
Administratrix
By
Attorney Jan. 25, 1944. G. C. BROWN 2,339,976
CONTROLLER FOR VARIABLE SPEED DRIVES
Filed July 27, 1940 2 Sheets-Sheet 2

Inventor
Glendon C. Brown, Deceased
By Jean T. Brown
Administratrix
By Arthur Luson
Attorney Patented Jan. 25, 1944

2,339,976

UNITED STATES PATENT OFFICE 2,339,976

CONTROLLER FOR VARIABLE SPEED DRIVES

Glendon C. Brown, deceased, late of Wauwatosa, Wis., by Jean F. Brown, administratrix, Riverside, Ill., assignor to Cutler-Hammer, Inc., Milwaukee, Wis., a corporation of Delaware Application July 27, 1940, Serial No. 348,049

32 Claims. (Cl. 74—1)

This invention relates to electrical apparatus for controlling the speed of a machine part relative to the speed of another machine part so that for given succeeding cycles of operation of the second part the ratio of total movement of the two parts may be varied. In other words, if the second part completes during each cycle a complete revolution, the first part has its speed varied during fractions of each such cycle so that its total amount of rotation varies in the desired manner for each cycle.

The invention, while not limited thereto, is particularly applicable to systems employing photo-electric means and is therefore particularly suited to machines the individual operating periods of which are of very short duration and which therefore are not easily controlled by the more conventional means whose mechanical and electrical inertia would make the necessary rapid response thereof difficult if not impossible. Furthermore, the strains on such usual controlling means, resulting from the large accelerating and decelerating forces necessary to actuate them, rapidly would make their response very unreliable and cause great variations from the results desired and would also greatly increase the wear and thus reduce the life of the various elements of the controller.

The present invention therefore preferably employs in combination with sensitive and quick acting electromagnetic relays of small mass and inductance, photoelectric and other electronic means which respond without any substantial delay due to the almost complete absence of mechanical and electrical inertia.

An object of the invention is to provide a controller for correlating the operation of two machine elements so that during part of periodically recurring intervals the two elements operate at speeds bearing a fixed relation to each other, while during the balance of said intervals the speed ratio of the elements varies selectively.

Another object is to provide a controller for the operation of a machine element in such a manner that its total movement during succeeding cycles of like duration varies selectively for different cycles, and to synchronize these cycles with the cycles of operation of another machine element.

Another object of the invention is to provide a controller for the aforementioned purpose which is accurate in its response.

Another object is to provide a controller which is readily adjusted for different cycles of operation.

Another object is to provide a controller which is adapted for rapid operation and response.

Another object is to provide a controller which is easily adapted to different machines.

Another object is to provide a controller which is easily maintained.

Other objects and advantges will hereinafter appear.

The accompanying drawings are illustrative of an embodiment of the invention.

Figure 1:
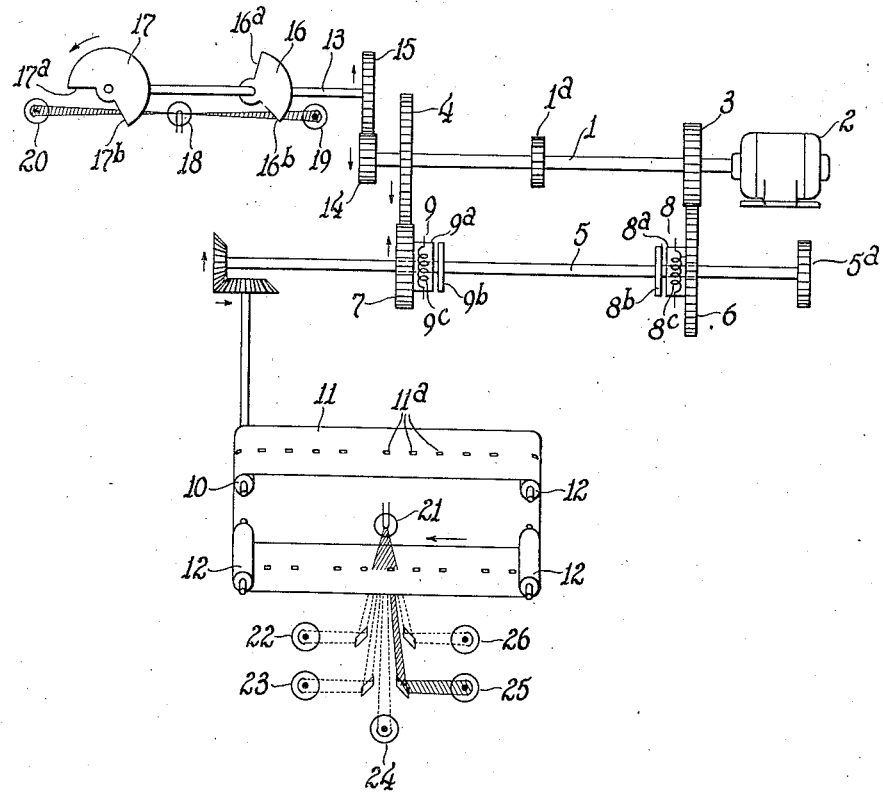
Figure 3:
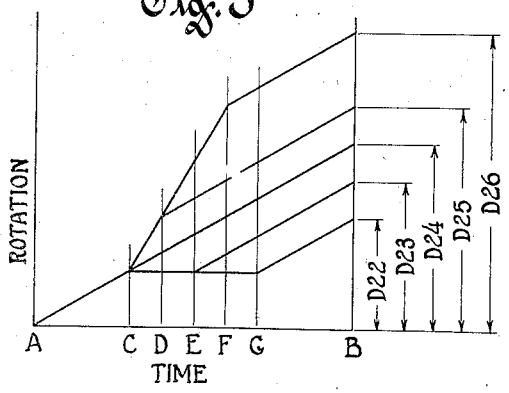

In the drawings, Figure 1 is a diagrammatic drawing of certain elements of a machine the speed of one element of which is controlled cyclically relative to the speed of another element in accordance with the invention, together with a driving motor and certain elements of a controller therefor, while Fig. 2 is a diagram of the electrical circuit, and Fig. 3 is a diagram illustrating the response of the speed controlled element to the operation of the controller.

Referring to the drawings, a shaft 1, which may be arranged to drive a machine element in any suitable manner, is coupled to a prime mover 2, which may be of any desired type and the speed of which, if desired, may be adjustable. Keyed to the shaft are gears 3 and 4 of different size. A second shaft 5 the speed of which is to be controlled and which in turn drives another machine element as by a gear 5ª has loosely mounted thereon the gears 6 and 7 which mesh with the gears 3 and 4 respectively, the gear ratio 3–6 being lower than the gear ratio 4–7. Connected to the gears 6 and 7 is one half 8ª and 9ª respectively of an electromagnetic coupling 8 and 9 respectively, having energizing coils 8ᶜ and 9ᶜ, respectively, while the cooperating other half 8ᵇ and 9ᵇ of the respective coupling is keyed to the shaft 5. Hence when the respective coupling is energized, the shaft 5 is driven at a corresponding speed by the motor 2, while if both couplings are deenergized the shaft 5 comes to rest.

It should be pointed out that the parts coupled to the shaft 5 should have as little mechanical inertia as possible so as to permit said shaft to rapidly change its speed in accordance with the driving force applied thereto.

Coupled to the shaft by gears or other positive driving means is a pulley 10 over which is passed an endless band or ribbon 11, which is guided in its path by guide rollers 12. The ribbon thus moves at all times with a speed which is proportional to the speed of the shaft 5 and a given distance on the ribbon corresponds to a proportionate angular rotation of the shaft 5.

As the shaft 1 is driven by the prime mover 2 at a relatively constant speed, its rotation may be employed to measure or determine the duration of the individual periods into which the operation of the shaft 5 is to be divided. For this purpose a third shaft 13 is suitably coupled as by gears 14 and 15 to the shaft 1 so that the shaft 13 makes one complete revolution in a period of time which is equal to the operating period desired. If it is desirable to vary the length of the period of the shaft 5 relative to the speed of the shaft 1, a variable speed drive may be interposed between the shafts 1 and 13 instead of the gears 14 and 15. This will vary the length of an operating period of the shaft 5 relative to the number of rotations of the shaft 1.

The shaft 13 carries cams 16 and 17 which are sector shaped and which cooperate with a light source 18 and two photo-tubes 19 and 20, respectively, all so arranged that normally beams of light from the source 18 are directed on the cells 19 and 20 to thereby energize the latter and make them conducting. The cam 16 is so shaped that the light beam striking the photo-tube 19 is intercepted when the leading edge 16$^a$ of the cam enters the path of the beam and it continues to shield the photo-tube until the trailing edge 16$^b$ passes through the beam. Likewise the cam 17 intercepts the beam directed onto the photo-tube 20 during part of the rotation of the shaft 13 as will be explained in detail hereinafter.

A light source 21 is mounted on one side of the ribbon 11, while on the opposite side are mounted 5 photo-tubes 22 to 26 inclusive. A light beam from the source 21 is directed towards the photo-tubes, so that the beam may illuminate the photo-tubes, but the beam is normally intercepted by the ribbon 11. The ribbon is provided with slots 11$^a$ which are arranged in such a manner that in certain positions of the ribbon light passes through a slot to strike the photo-tubes, the beam always striking first the tube 26 and then the other tubes in the reverse of their natural order to actuate the controller as will be explained hereinafter, the slots being of such length that as the beam travels from one tube to another it always impinges on at least one tube.

The additional apparatus comprising the controller is illustrated diagrammatically in Fig. 2. Direct current energy is supplied by a positive and a negative bus line $L^1$ and $L^2$ respectively. A relay 30, having an energizing coil 30$^a$ and a normally open contact 30$^b$ has its energizing coil connected between the line $L^1$ and the anode 31$^b$ of an electronic tube 31, having a cathode 31$^a$ connected to line $L^2$ and a grid 31$^c$. One terminal of a bias battery 32 is connected to the grid, the other terminal of said battery is connected to the line $L^1$ in series with the photo-tube 19 and to line $L^2$ in series with a resistor 33. A relay 34 has an energizing winding 34$^a$, normally closed contacts 34$^b$ and normally open contacts 34$^c$. The winding 34$^a$ is connected in a circuit with an electronic tube 35, a bias battery 36, a resistor 37 and the photo-tube 19 in a manner similar to the aforedescribed connections for relay 30 as is also apparent from the drawings.

A relay 38 has an energizing winding 38$^a$, normally open contacts 38$^b$ and normally closed contacts 38$^c$. One terminal of the energizing winding is connected to the line $L^2$, while the other end of said winding is connected through contacts 38$^b$ and contacts 30$^b$ to line $L^1$, and contacts 34$^c$ are connected in parallel with contacts 38$^b$. The common point of contacts 38$^b$ and 30$^b$ is connected through contacts 34$^b$ and in series therewith 38$^c$ to a bus bar 39. A second bus bar 39$^a$ is connected to the common point of contacts 30$^b$ and 38$^b$.

The controller is further provided with relays 40 to 44 inclusive, having energizing windings 40$^a$ to 44$^a$, respectively, and normally open contacts 40$^b$ to 44$^b$, respectively, electronic tubes 45 to 49, inclusive, bias batteries 50 to 54 inclusive and resistors 55 to 59, inclusive. The photo-tubes 22 to 26 inclusive are correlated and connected to the corresponding aforementioned relays, electronic tubes, batteries and resistors in the manner aforedescribed for the connections of relay 30 and photo-tube 20, except that the circuits extend from bus bar 39 instead of line $L^1$.

The relays 40 to 44, inclusive, each control one of the energizing windings 60$^a$ to 64$^a$ of corresponding relays 60 to 64, inclusive, as will be explained more in detail hereinafter. Each of the relays 60 to 64 is provided with a normally open maintaining contact 60$^b$ to 64$^b$, respectively, the relays 60 to 63 with normally closed contacts 60$^c$ to 63$^c$ respectively and relays 60, 61, 63 and 64 with normally open contacts 60$^d$, 61$^d$, 63$^d$ and 64$^d$, respectively.

One terminal of each of the relay coils 60$^a$ to 64$^a$ is connected to the line $L^2$, while the other terminal of said coils is connected as follows: Contacts 40$^b$ to 44$^b$, inclusive, are connected in parallel with contacts 60$^b$ to 64$^b$, inclusive, respectively. A circuit extends from bus bar 39$^a$ through contacts 40$^b$ to the second terminal of coil 60$^a$. Another circuit extends from bus bar 39$^a$ through contacts 60$^c$ and 41$^b$ to coil 61$^a$, another circuit through contacts 60$^c$, 61$^c$ and 42$^b$ to coil 62$^a$, another circuit through contacts 60$^c$, 61$^c$, 62$^c$, 43$^b$ to coil 63$^a$ and at last a circuit from bus bar 39$^a$ through contacts 60$^c$, 61$^c$, 62$^c$, 63$^c$, 44$^b$ to coil 64$^a$.

A relay 65 is provided with an energizing winding 65$^a$, normally closed contacts 65$^b$ and normally open contacts 65$^c$. A second relay 66 has an energizing winding 66$^a$ and normally closed contacts 66$^b$. A circuit extends from line $L^1$ through contacts 66$^b$, contacts 65$^b$, coil 8$^c$ to line $L^2$ and a second circuit from line $L^1$, through contacts 66$^b$, contacts 65$^c$ through coil 9$^c$ to line $L^2$. There are further provided four condensers 67 to 70 inclusive, which are connected as follows: A circuit extends from line $L^1$ through contact 64$^d$, condenser 67, coil 65$^a$ to line $L^2$, a second circuit from line $L^1$, through contact 63$^d$, condenser 68, coil 65$^a$ to line $L^2$, a third circuit from line $L^1$ through contacts 61$^d$, condenser 69, coil 66$^a$ to line $L^2$ and a fourth circuit from line $L^1$ through contact 60$^d$, condenser 70, coil 66$^a$ to line $L^2$.

The apparatus functions as follows: The grids of the various electronic tubes are biased by the correlated batteries and resistors so that when the corresponding photo-tubes are not illuminated the electronic tubes are not conducting, while when the photo-tubes are illuminated, the bias of the grids, by virtue of the current flowing from the line $L^1$ through the corresponding photo-tube and resistor to line $L^2$, becomes sufficiently positive to permit a current flow between the cathode and anode and through the correlated relay coil which energizes said relay to operate it.

Let it be assumed that the apparatus is in the position shown in Fig. 1 and the lines $L^1$, $L^2$ be energized, that the motor 2 be also energized, and that the light sources 18 and 21 be supplied with energy. Light then falls at that moment on photo-tube 25, but the latter does not pass any current, as the bus bar 39 which supplies it with energy is deenergized. However, energy flows from line L¹, through contacts 66ᵇ and 65ᵇ, through coil 8ᶜ of the slow speed clutch, and the shaft 5 is rotated at the slow speed. Also light falls on the photo-tubes 19 and 20, thus energizing relay 30, which closes contact 30ᵇ and this energizes bus bar 39ᵃ and permits relay 34 to operate, opening contact 34ᵇ and closing contact 34ᶜ, thereby energizing relay 38, which in turn closes its maintaining contact 38ᵇ and opens contact 38ᶜ, thereby isolating bus bar 39.

A moment thereafter disc 17 interrupts with its leading edge 17ᵃ the beam of light falling on photo-tube 20 and relay 34 drops, but relay 30 remains energized until disc 16 interrupts the light falling on photo-tube 19 whereupon relay 30 also drops, thereby also disconnecting relay 38. After further rotation the disc 16 again uncovers the light source with respect to photo-tube 19, causing relay 30 to operate. This energizes bus bar 39ᵃ, while bus bar 39 is also energized. If at that time a beam of light from source 21 falls through a slot 11ᵃ on one of the photo-tubes 22 to 26, inclusive, for instance on photo-tube 26, the latter is energized to energize relay 44 and this in turn energizes relay 64. If thereafter the photo-tube 25 is illuminated before the photo-tube 20 is again energized through further rotation of disc 17, the relay 43 is in turn energized which energizes relay 63, while the latter cuts off the current supply from relay 63. The time between the energization of photo-tubes 19 and 20 is such that it approximately equals the time a light beam through a slot 11ᵃ may sweep over any three contiguous photo-tubes, the individual slots being so placed that the last photo-tube which is illuminated in a given cycle before the photo-tube 20 is illuminated determines the speed at which the shaft 5 operates for a fraction of a period as will be explained further. As the photo-tube 20 is again energized, relays 34 and 38 are energized, thus cutting off bus bar 39 and returning any of the relays 40 to 44 inclusive, which may have been energized to their original position to repeat the cycle.

If photo-tube 26 only receives light, while both buses 39 and 39ᵃ are energized the relay 64 is energized, energizing relay 65 for a period determined by the capacity of condenser 67, the relay 65 disconnecting the slow speed clutch 8 and energizing the high speed clutch for said period, while thereafter the low speed clutch is again engaged. If photo-tube 25 also receives light, relay 65 is energized through the smaller capacity condenser 68, thus energizing the high speed clutch for a shorter time. If photo-tube 24 is also illuminated, the slow speed engagement is not broken, while if photo-tubes 23 or 23 and 22 are illuminated the relay 66 is energized for a shorter or longer time, respectively, thus deenergizing both clutches which permits shaft 5 to come to rest.

Thus by the proper placement of the slots 11ᵃ relative to each other and relative to the cams 16 and 17 the amount of travel of the shaft 5 for each revolution of the shaft 13 or a proportional amount of rotation of shaft 1 may be regulated. Diagram Fig. 3 illustrates the relation between time or angular travel of shaft 1 and angular travel of shaft 5 for different locations of slots 11ᵃ. The abscissa A—B represents an operating period, while the ordinates represent the total angular travel of shaft 5 at any moment from the beginning of the period. From A to C the shaft 5 is rotated through the slow speed clutch. If cell 22 is now energized at the moment C¹ the shaft stands still until the moment G, whereupon it resumes its travel at slow speed to the end of the cycle. The result is a minimum distance of travel as indicated by the ordinate D²². If one of the other cells is the last one to be illuminated as aforedescribed, the speeds of the shaft and the distances traveled by it are as indicated in the diagram.

Instead of driving the shaft 5 from the shaft 1 by means of a plurality of gears of different speed ratio, the shaft 5 may be driven by other means which are controllable cyclically to afford cyclically variable speed ratios to correlate the speeds of the two shafts in the aforedescribed manner.

The photoelectric means associated with the shaft 1 and/or shaft 5 may further be replaced by other circuit controlling means which are sufficiently rapid in response to afford the accuracy of control desired.

It is further obvious that the system may be provided with a greater number of magnetic clutches or their equivalents and the number of the different timing circuits and the resulting speeds and intervals may be more or less than those shown in the drawings.

The invention is not limited to the description and the appended drawings which are not only illustrative of one embodiment thereof, and the appended claims are to be construed as covering all obvious modifications of the present invention.

What is claimed as new and desired to be secured by Letters Patent is:

1. In combination, a plurality of electro-responsive control devices, and control means for said devices including means to selectively energize any one of said devices and to selectively maintain it energized for any one of a number of predetermined fractions of periodically recurring equal intervals of time and to maintain a given one of said devices energized for a given predetermined recurring interval.

2. In combination, a plurality of electro-responsive control devices, and a plurality of means each including individual timing means to effect response of said control devices selectively and for selected fractions of periodically recurring equal intervals of time and to effect response of one of said devices during a periodically recurring given interval.

3. In combination, a plurality of electro-responsive control devices, a plurality of means, each including individual timing means, to effect response of said control devices selectively and for selected fractions of periodically recurring equal intervals of time and to effect response of one of said devices during a periodically recurring given interval, and automatic means to effect control of said plurality of means selectively.

4. In combination, a driven device, a relatively constant speed power driver therefor, commutatable driving connections between said device and said driver to selectively afford different speeds of said driven device, control means for said connections including a plurality of means to select any one of said driving connections and to maintain such connection for any one of a number of predetermined fractions of periodically recurring equal intervals of time and to maintain a given one of said connections for a given periodically recurring interval.

5. In combination, a plurality of electro-responsive control devices, control means for said devices including means to selectively energize any one of said devices and to selectively maintain it energized for any one of a number of predetermined fractions of periodically recurring equal intervals of time and to maintain a given one of said devices energized for a given predetermined recurring interval, and photoelectric devices through which said control means are controllable by a light beam to effect response of said control devices selectively.

6. In combination, a plurality of electro-responsive control devices, a plurality of means each including individual timing means to effect response of said control devices selectively and for selected fractions of periodically recurring equal intervals of time and to effect response of one of said devices during a given periodically recurring interval, and photoelectric devices through which said plurality of means are controllable by a light beam to effect response of said control devices selectively.

7. In combination, a plurality of electro-responsive control devices, a plurality of means, each including individual timing means to effect response of said control devices selectively and for selected fractions of periodically recurring equal intervals of time and to effect response of one of said devices during a given periodically recurring interval, photoelectric devices through which said plurality of means are controllable by a light beam to effect response of said control devices selectively, and automatic means to subject said photoelectric devices selectively to the influence of a beam of light.

8. In combination, a plurality of electro-responsive control devices, a plurality of means each including individual timing means to effect response of said control devices selectively and for selected fractions of periodically recurring equal intervals of time and to effect response of one of said devices during a given periodically recurring interval, photoelectric devices through which said plurality of means are controllable by a light beam to effect response of said control devices selectively, and automatic means comprising a moving perforated tape through the medium of which any of said photoelectric devices may be subjected selectively as prearranged to the influence of a fixed beam of light.

9. A periodically operating control system comprising, the combination of means to control the duration of a given period, a plurality of electro-responsive control devices, means under the control of said first mentioned means to effect response of said electro-responsive control devices selectively for given intervals of said period with differentiation of certain of said devices during a given minimum interval.

10. A periodically operating control system comprising, the combination of means to control the duration of a given period, a plurality of electro-responsive control devices, circuit commutating means, means under the control of said first mentioned and said second mentioned means to effect response of said electro-responsive control devices selectively for given intervals of said period with differentiation of certain of said devices during a given minimum interval.

11. A control system for regulating the cyclic operation of a machine comprising, the combination of means to control the duration of a given period of operation, a plurality of electro-responsive control devices adapted to control the operation of said machine, means under the control of said first mentioned means to effect response of said electro-responsive control devices selectively for given intervals of said period with differentiation of certain of said devices during a given minimum interval, and photoelectric devices through which said second mentioned means are controllable by a light beam to effect response of said control devices selectively.

12. A control system for regulating the cyclic operation of a machine comprising, the combination of means to control the duration of a given period of operation, a plurality of electro-responsive control devices adapted to control the operation of said machine, means under the control of said first mentioned means adapted to effect response of said electro-responsive control devices selectively for given intervals of said period with differentiation of certain of said devices during a given minimum interval, and photoelectric devices through which said first mentioned and said second mentioned means are controllable by a light beam to effect response of said control devices selectively.

13. A controller for a periodically operating machine having one element operable at a rate having a fixed ratio relative to the rate of operation of another element of said machine during minimum intervals of succeeding periods of operation of said machine and at average ratios selectively differing from said fixed ratio during the balance of such periods, comprising, in combination with said elements, electromagnetic means for controlling said one element, and means controllable jointly by said elements for controlling said electromagnetic means.

14. A controller for a periodically operating machine having one element operable at a rate having a fixed ratio relative to the rate of operation of another element of said machine during minimum intervals of succeeding periods of operation of said machine and at average ratios selectively differing from said fixed ratio during the balance of such periods, comprising in combination with said elements, electromagnetic means for controlling said one element, and photoelectric means controllable jointly by said elements for controlling said electromagnetic means.

15. A controller for a periodically operating machine having one element operable at a rate having a fixed ratio relative to the rate of operation of another element of said machine during minimum intervals of succeeding periods of operation of said machine and at average ratios selectively differing from said fixed ratio during the balance of such periods, comprising in combination with said elements, electromagnetic means for controlling said one element, means controllable by said other element, and means controllable by said first element and said former means for controlling said electromagnetic means.

16. A controller for a periodically operating machine having one element operable at a rate having a fixed ratio relative to the rate of operation of another element of said machine during minimum intervals of succeeding periods of operation of said machine and at average ratios selectively differing from said fixed ratio during the balance of such periods, comprising in combination with said elements, electromagnetic means for controlling said one element, means controllable by said other element and said former means for controlling said electromagnetic means.

17. A controller for a periodically operating machine having one element operable at a rate having a fixed ratio relative to the rate of operation of another element of said machine during minimum intervals of succeeding periods of operation of said machine and at average ratios selectively differing from said fixed ratio during the balance of such periods, comprising in combination with said elements, electromagnetic means for controlling said one element, photoelectric means controllable by said other element, and photoelectric means controllable by said first element and said former photoelectric means for controlling said electromagnetic means.

18. A controller for a machine having one element operable at a rate which is variable relative to the rate of operation of another element of said machine, comprising in combination with said elements, selective means controllable by said one element, electromagnetic means for controlling said one element, and means jointly controllable by said first mentioned means and said other element for controlling said electromagnetic means.

19. A controller for a machine having one element operable at a rate which is variable relative to the rate of operation of another element of said machine, comprising in combination with said elements, selective means controllable by said one element, electromagnetic means for controlling said one element, and photoelectric means jointly controllable by said first mentioned means and said other element for controlling said electromagnetic means.

20. A controller for a machine having one element operable at a rate which is variable relative to the rate of operation of another element of said machine, comprising in combination with said elements, a plurality of electromagnetic means to establish driving connections between said elements selectively, electromagnetic relays normally effecting connections through one of said electromagnetic means, electromagnetic means for commutating said relays and thereby effect driving connections through another of said electromagnetic driving means, and photoelectric means jointly controllable by said elements and adapted to control said electromagnetic commutating means selectively.

21. The combination with a machine having one element operable at a rate which is variable relative to the rate of operation of another element of said machine, of photoelectric means operable by said other element, electromagnetic switching means controlled by said photoelectric means, preselecting means operable by said one element, other photoelectric means jointly controllable by said preselecting means and said switching means, electromagnetic commutating means controlled by said other photoelectric means and a plurality of power transmitting means for selectively driving said one element and controlled by said electromagnetic commutating means.

22. The combination with a machine having two elements operable at speeds which are variable relative to each other, of a plurality of electromagnetic means affording driving connections between said elements at different speed ratios selectively and normally biased to effect one of said connections, means presettable by one of said elements for commutating said driving connections selectively, and means operable by the other of said elements for releasing said presetting means to effect said commutation during given periods of operation of said other element.

23. In combination, two bus bars, electromagnetic means adapted to energize said bus bars selectively, timing means for cyclically controlling said electromagnetic means, a plurality of electromagnetic relays, photoelectric means for selectively connecting said relays to one of said bus bars, a plurality of translating circuits, a second plurality of electromagnetic relays, one for each one of said first plurality of relays and connectable thereby to said other bus bar and provided with means for selectively controlling the period of energization of said translating circuits.

24. In combination, two bus bars, electromagnetic means adapted to energize said bus bars selectively, timing means for cyclically controlling said electromagnetic means, a plurality of electromagnetic relays, means for selectively connecting said relays to one of said bus bars, a plurality of translating circuits, a second plurality of electromagnetic relays, one for each one of said first plurality of relays and connectable thereby to said other bus bar and provided with means for selectively controlling the period of energization of said translating circuits.

25. In combination, two bus bars, an electromagnetic switch having an energizing winding and contacts adapted to connect one of said bus bars to a current supply, electromagnetic switching means adapted to connect the other of said bus bars to a current supply, timing means for cyclically controlling said energizing winding and said switching means, a plurality of electromagnetic relays, means to selectively connect said relays to said other bus bar, a plurality of electromagnetic clutches, a plurality of electromagnetic switches for controlling the energization of said clutches selectively including timing means for controlling the duration of said energization selectively, and a second plurality of electromagnetic relays, one for each one of said first plurality of relays and connectable thereby to said one bus bar and controlling said plurality of electromagnetic switches selectively.

26. In combination, two bus bars, electromagnetic means adapted to energize said bus bars selectively, timing means for cyclically controlling said electromagnetic means, a plurality of electromagnetic relays, means to selectively connect said relays to one of said bus bars, a plurality of translating circuits, a plurality of electromagnetic switches for controlling energization of said circuits selectively including means for controlling the duration of said energization, and a second plurality of electromagnetic relays, one for each one of said first plurality of relays and connectable thereby to said other bus bar and controlling said plurality of electromagnetic switches selectively.

27. In combination, a first shaft rotating continuously at a relatively constant speed, a second shaft, a plurality of electromagnetic means for selectively coupling said second shaft to said first shaft at different predetermined speed ratios, and selector means providing for initiation of a fixed operating period and controlled by said shafts for periodically energizing one of said electromagnetic means for a predetermined interval of said period, and thereafter selectively energizing any of said plurality of electromagnetic means for a predetermined number of other intervals of said period.

28. In combination, a first member operating continuously at a relatively constant speed, a second member, a plurality of electromagnetic means for selectively coupling said second member to said first member at different predetermined speed ratios, selector means providing for initiation of a fixed operating period and controlled by said members for periodically energizing one of said electromagnetic means for a predetermined interval of said period, and thereafter selectively energizing any of said plurality of electromagnetic means, and means for maintaining such energization for one of a plurality of predetermined intervals of said period.

29. In combination, a first shaft rotating continuously at a relatively constant speed, a second shaft, a first electromagnetic clutch for normally coupling said second shaft to said first shaft at a given speed ratio, a second electromagnetic clutch adapted to establish a driving connection between said second shaft and said first shaft at another speed ratio, and selector means providing for initiation of a fixed operating period and controlled by the operation of said shaft and controlling said clutches to maintain energization of said first clutch during a periodically recurring fixed interval of said period, and thereafter selectively energizing one of said clutches during a predetermined number of other intervals of said period.

30. In combination, a first member operated continuously at a relatively constant speed, a second member, a first electromagnetic clutch for normally coupling said second member to said first member at a given speed ratio, a second electromagnetic clutch adapted to establish a driving connection between said second member and said first member at another speed ratio, selector means providing for initiation of a fixed operating period and controlled by the operation of said members and controlling said clutches to maintain energization of said first clutch during a periodically recurring fixed interval of said period, and thereafter to selectively energize one of said clutches, and means for maintaining said one of said clutches energized for one of a plurality of predetermined intervals of said period.

31. The combination, with a machine having two elements operable at speeds which are variable relative to each other, of a source of energy, a first shaft, operable at a relatively constant speed, a second shaft, a plurality of electromagnetic coupling means selectively energizable from said source to afford driving connections between said shafts at different speed ratios and normally biased to effect one of said connections, two bus bars, electromagnetic relay means controlled by said first shaft and adapted to energize said bus bars from said source selectively, a first plurality of electromagnetic relays, selector means controlled by said second shaft for selectively connecting said relays to said source in series with one of said bus bars, a second plurality of electromagnetic relays, one for each one of said first plurality of relays, and connectable thereby to said source in series with said other bus bar, and means controlled by said second plurality of relays and arranged to selectively control the energization of said electromagnetic coupling means and the intervals of such energization.

32. The combination, with a machine having two elements operable at speeds which are variable relative to each other, of a source of energy, a first shaft, operable at a relatively constant speed, a second shaft, a plurality of electromagnetic coupling means affording driving connections between said shafts at different speed ratios selectively, and normally biased to effect one of said connections, two bus bars, photoelectric means controlled by said first shaft, electromagnetic relay means controlled by said photoelectric means and adapted to energize said bus bars selectively, a first plurality of electromagnet relays, photoelectric selector means controlled by said second shaft and arranged to control said first plurality of relays for selectively connecting them to one of said bus bars, a second plurality of electromagnetic relays, one for each one of said first plurality of relays, and connectable thereby to said source in series with said other bus bars, and means controlled by said second plurality of relays and arranged to selectively control the energization of said electromagnetic coupling means and the interval of such energization.

JEAN F. BROWN,
*Administratrix of the Estate of Glendon C. Brown, Deceased.*

CERTIFICATE OF CORRECTION.

Patent No. 2,339,976. January 25, 1944.

GLENDON C. BROWN, DECEASED.

It is hereby certified that error appears in the printed specification of the above numbered patent requiring correction as follows: Page 3, second column, line 32, strike out the word "not"; and that the said Letters Patent should be read with this correction therein that the same may conform to the record of the case in the Patent Office.

Signed and sealed this 28th day of March, A. D. 1944.

Leslie Frazer (Seal) Acting Commissioner of Patents.